United States Patent [19]

Huiyer

[11] Patent Number: 4,974,902
[45] Date of Patent: Dec. 4, 1990

[54] COUPLING DEVICE IN THE DRIVE MECHANISM FOR A MOVABLE PANEL OF AN OPEN ROOF CONSTRUCTION FOR A VEHICLE

[75] Inventor: Johannes N. Huiyer, Velserbroek, Netherlands

[73] Assignee: Vermeulen-Hollandia Octrooien II B.V., Netherlands

[21] Appl. No.: 527,713

[22] Filed: May 21, 1990

Related U.S. Application Data

[63] Continuation of Ser. No. 278,679, Dec. 1, 1988, abandoned.

[30] Foreign Application Priority Data

Dec. 16, 1987 [NL] Netherlands ............... 8703036

[51] Int. Cl.⁵ .............................................. B60J 7/57
[52] U.S. Cl. ...................................... 296/223; 296/224
[58] Field of Search ..................... 296/221, 223, 224

[56] References Cited

U.S. PATENT DOCUMENTS 4,601,512  7/1986  Boots .................................. 296/221

FOREIGN PATENT DOCUMENTS 2090630A  7/1982  United Kingdom .
2133460   7/1984  United Kingdom ............... 296/221

Primary Examiner—Dennis H. Pedder
Attorney, Agent, or Firm—Kinney & Lange

[57] ABSTRACT

A coupling apparatus for driving a movable panel with respect to a roof opening in a vehicle includes a pair of mutually parallel, longitudinally extending, stationary guide rails fixedly positioned on opposite sides of a roof opening. A driving part and a driven part are each slidably mounted with respect to the guide rails. A coupling member is pivotally connected to the driven part and is movable between a coupling position in which it couples the driven part to the driving part so that both can move with respect to the guide rails and a locking position in which it locks the driven part to prevent its movement along the guide rails while allowing the driving part to slide on those rails.

11 Claims, 5 Drawing Sheets

COUPLING DEVICE IN THE DRIVE MECHANISM FOR A MOVABLE PANEL OF AN OPEN ROOF CONSTRUCTION FOR A VEHICLE

This is a continuation of application Ser. No. 07/278,679 field on Dec. 1, 1988, abandoned as of the date of this application.

BACKGROUND OF THE INVENTION

The invention relates to a coupling device and apparatus in the drive mechanism for a movable panel of an open roof construction for a vehicle, intended to alternately couple and uncouple [a driving part an]a driven part with respect to a driving part and to alternately lock and unlock the driven part with respect to a stationary part fixedly mounted to the roof.

In such a device, a coupling member is connected to the driven part and is movable in direction transverse to the movement of the driven part. The coupling member is movable between a coupling position in which it couples the driven part to the driving part, and a locking position in which it locks the driven part with respect to the stationary part.

Such a coupling device is known from the German Pat. specification No. 3.146.698. In that patent specification, the coupling member consists of a slide displaceable in transverse direction. As guide element the coupling member has a guide slot inclining in transverse direction and opening at its front side, the guide slot being able to cooperate with a guide cam formed on the stationary guide. Between the coupling member and the driven part there is provided a leaf spring loading the coupling member in a direction to its coupling position.

This leaf spring is disadvantageous. It causes additional friction in the locking position of the coupling member, because the leaf spring loads the coupling member against the driving part. Furthermore, the coupling device is not positively held in its coupling position; but can be accidentally displaced from that position against the force of the spring.

It is an object of the present invention to provide a coupling apparatus of the type mentioned above, but without the disadvantages of this prior art.

For this purpose the stationary part of the coupling apparatus of the present invention includes a pair of parallel, relatively straight guide rails fixedly mounted on either side of the roof opening and a counter part or latch plate fixedly mounted with respect to the roof and the guide rails. The coupling member is in engagement with this latch plate when it is in the locking position. The latch plate of the stationary part is provided with a latch plate guide element and the coupling member is provided with a cooperating latch guide element, each situated to cooperate with the other to bring the coupling member and latch plate into and out of engagement with each other. The coupling member has cam guide elements, and the driving part has cooperating cam guide elements, wherein the guide elements of the stationary part, the driving part and the coupling member are arranged and constructed such that in any position the coupling member is positively guided and is positively retained against undesired displacements.

In this way there is no need for a spring in the coupling apparatus anymore, while the proper operation of the coupling device is ensured at all times since the guide elements prevent an undesired displacement of the coupling member in a positive way.

An advantageous embodiment of the coupling apparatus according to the invention is characterized in that the guide elements of the stationary part and the coupling member effect the first initial movement from the coupling position and the last return movement to the coupling position, wherein for each of these movements separate guide elements are provided, and the remaining movements of the coupling member are determined by the mutual interaction of the guide elements of the coupling member and the driving part.

By providing separate guide elements for the first initial movement from the coupling position and the last return movement to the coupling position it is possible to obtain a locked coupling position of the coupling member without loading the coupling member in sideways direction.

Preferably, the coupling member is connected to the driven part pivotable about a substantially vertical pivot axis to move between the coupling position and the locking position. Said pivoting movement of the coupling member between the coupling position and the locking position requires little force to be placed on the driving part, and there will not develop any torque causing friction during said pivoting movement.

Preferably, the coupling member is provided with a forwardly facing stop cam positioned radially outwardly from the pivot axis, and the stationary part is provided with a stop shoulder facing backwardly and lying in the path of the stop cam when the coupling member is in the coupling position.

The movement of the stop cam of the coupling member against the stop shoulder of the stationary part effects the first initial movement of the coupling member from the coupling position in a simple and facile manner.

The stationary part latch plate is provided with a locking recess. The coupling member is provided with a locking nose or latch which is able to engage into the locking recess.

Part of the rear wall of the latch plate locking recess is formed as a guiding surface inclined backwardly in the direction to the driven part. A guiding surface is also formed on the locking nose or latch of the coupling member. These two guiding surfaces cooperate with each other. By this cooperation of these guiding surfaces of the latch of the coupling member and the locking recess, the last return movement of the coupling member to the coupling position is achieved, whereby it is made possible to bring the coupling member into a stable retained position, from which the coupling member can only be displaced by the first initial movements of these guiding surfaces with respect to each other.

In a preferred embodiment of the invention, the driving part is provided with a guide slot whose side walls form the guide elements; and the coupling member includes a guide cam which serves as a guide element and which is in engagement with the guide slot of the driving part.

This engagement between these guide elements of the coupling member and the driving part causes the coupling member to be forcibly guided by the driving part as well as to be positively retained thereby.

As shown herein, the guide slot in the driving part is provided with a rear slot portion parallel to the direction of movement of the driving part, an intermediate slot portion inclining to said direction of movement, and a front slot portion substantially transverse to said direction of movement.

The rear slot portion of the guide slot in the driving part causes the retaining of the coupling member in the locking position, the inclined intermediate slot portion effectuates a part of the pivoting movement of the coupling member, and the substantially transverse front slot portion offers a stable coupling position to the coupling member.

Herein it is favorable that when in the coupling position of the coupling member, the line of connection between the point of engagement of the coupling member with the driving part and the point of engagement of the coupling member with the driven part extends substantially parallel to the direction of movement of the driving part. In this way, no torque will develop on the coupling member during the driving of the driven part by the driving part, so that no additional friction occurs and a light driving operation is possible.

Preferably, the driving part is provided with a backwardly facing stop shoulder, and the driven part is provided with a forwardly facing stop shoulder lying in the path of said backwardly facing stop shoulder of the driving part. Consequently, a simple and direct driving of the driven part takes place by the backward sliding movement of the driving part.

Advantageously, in the coupling position of the coupling member the latch thereof is laterally retained with play between a longitudinal edge of the driven part and a longitudinal edge of the stationary part. In this way the coupling member is fully retained in its coupling position.

The invention will hereafter be elucidated with reference to the drawing which shows an embodiment of the coupling apparatus according to the invention by way of example.

DETAILED DESCRIPTION OF THE PREFERRED EMBODIMENTS

Figure 1:
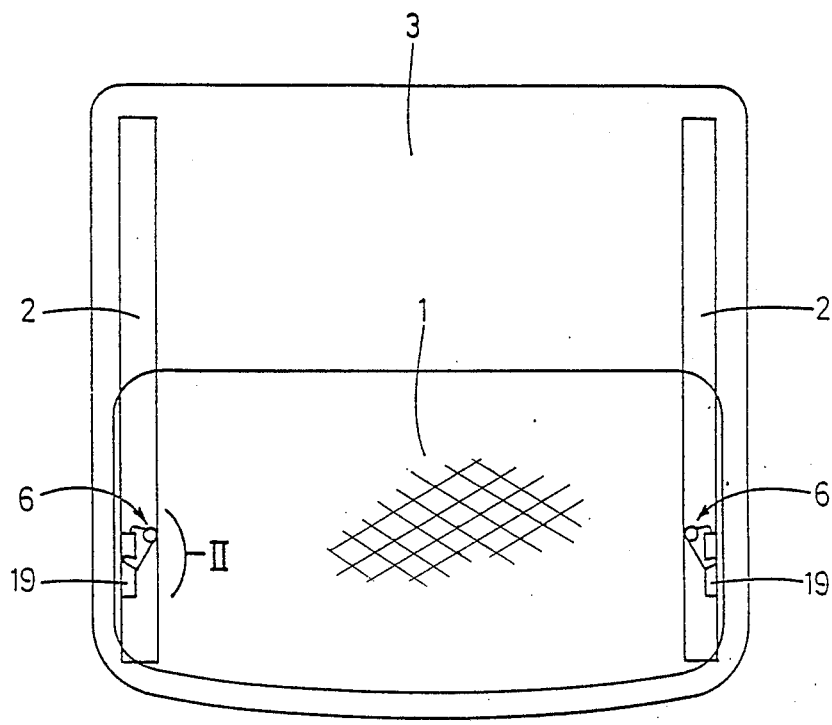
FIG. 1 is a very schematic top plan view of an open roof construction for a vehicle in which the coupling apparatus of the invention is used, in which the front side of the roof is directed downwardly, and in which the relative position of the coupling apparatus to the open roof construction is shown.
Figure 3:
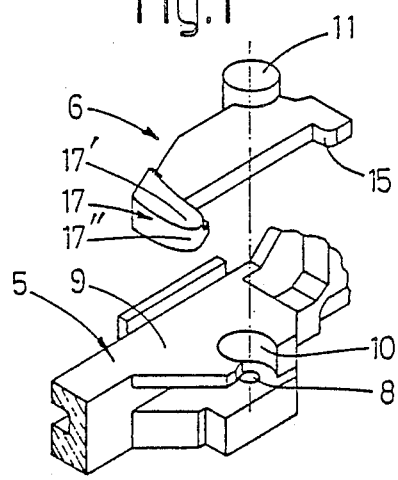
FIG. 3 is a perspective view of the coupling member and a fragment of the driven part of the coupling apparatus according to the invention on an enlarged scale.

FIG. 1 shows an open roof construction for a vehicle, which is constructed as a so-called tilt-sliding roof of which a roof panel 1 is adjustable between a forward closed position in an opening in a fixed roof 3 of a vehicle and a backwardly inclined tilted vent position on one hand; and between the closed position and a rearward open position below the fixed roof on the other hand.

A stationary part is fixedly mounted to the fixed roof 3 and includes a pair of stationary, longitudinally extending, mutually parallel guide rails 2. A driving part 4 and a driven or control part 5 are each slidably mounted in, and are guided by, one of the guide rails 2. Roof panel 1 is supported on either side of the roof opening with respect to driving parts 4 and driven parts 5 by means of mechanisms of any usual or preferred construction not shown, and forming no part of this invention per se.

The driving part 4 is operably connected to a pulling and pushing means 4' indicated by a dot and dash line. This pull-push means can be operated by an electrical drive or a manual crank.

For controlling and driving roof panel 1, the driving part 4 and the driven or control part 5 should be coupled to each other during the sliding movements of the panel 1 below the fixed roof 3. The driving part 4 and the driven part 5 should be uncoupled from each other, and driven part 5 should be locked with respect to the stationary guide rails 2 during the tilting movements of the roof panel 1.

For this purpose the present coupling apparatus is provided. The coupling apparatus includes a coupling member 6 pivotally connected to the driven part or control part 5 about a substantially vertical pivot axis. The coupling member 6 is pivotable between a coupling position, in which it couples the driven part 5 to the driving part 4, and a locking position, in which it locks the driven part 5 with respect to the stationary guide rail 2. For this purpose the coupling member 6 has a vertical pivot pin 7 which is freely rotatable in a cavity 8 in a lateral extension 9 of the driven part 5. The lateral extension 9 of the driven part 5 is provided with a cylindrical segment-shaped recess 10 in which a cylindrical stub shaft 11 of the coupling member 6 is received, the axis of the cylindrical shaft 11 being coextensive with the axis of pivot pin 7.

Figure 2:
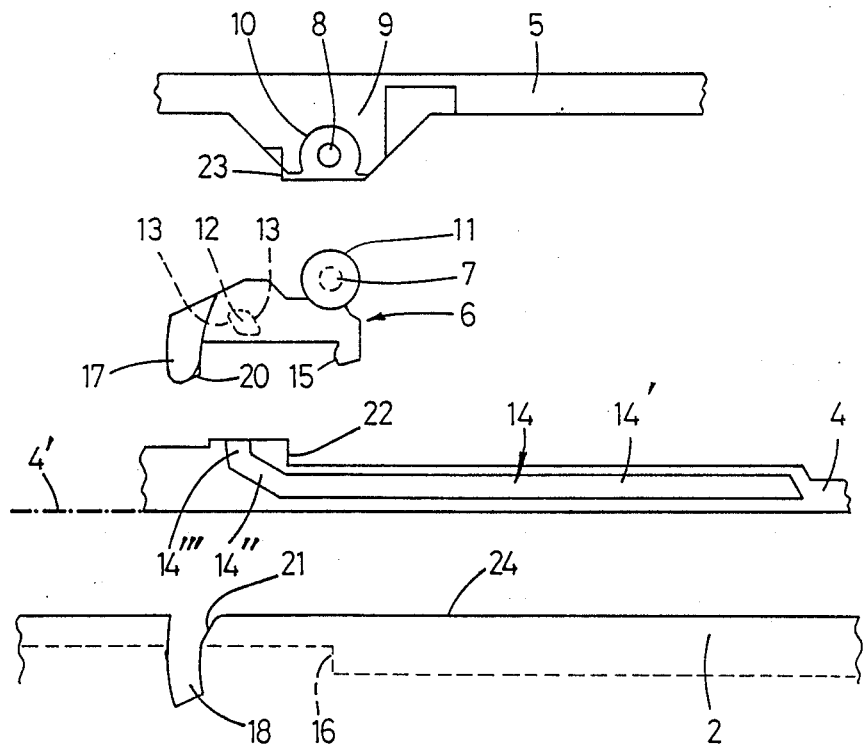
FIG. 2 shows the enlarged detail II of FIG. 1, wherein the parts of the coupling apparatus according to the invention are illustrated separately from each other.

The coupling member 6 further includes coupling member cam guide elements incorporated into a guide cam 12 formed on the lower side thereof. This guide cam 12 has a pair of parallel guide surfaces 13,13. The guide cam 12 is guided in and is controlled by driving part cam guide elements provided by a guide slot 14 provided in the driving part 4 and being open upwardly as seen in FIG. 2. This guide slot 14 has a rear slot portion 14' extending in the direction of movement of the driving part 4, an inclined intermediate slot portion 14" adjoining the front end of the rear slot portion 14' and inclining forwardly in the direction toward the driven part 5, and a front slot portion 14''' extending substantially transverse to the direction of movement of the driving part 4 and the driven part 5. The guide cam 12 of the coupling member 6 is formed and disposed with respect to the pivot pin 7 in such a way that, when the guide cam 12 is in the front or rear slot portions 14''', or 14' respectively, the guide surfaces 13 of the guide cam 12 engage the side walls or guiding surfaces of the slot 14; and during the passage through the intermediate slot portion 14" the guide cam 12 is able to turn in the guide slot 14.

The stationary part includes a counter part or latch plate 19 which is provided with a locking recess 18; and the coupling member 6 includes a locking nose or latch 17 facing away from the driven part 5.

The coupling member 6 is also provided on its rear end with a forwardly facing stop cam 15 facing away from the driven part 5 and positioned radially outwardly from the axis of the pivot pin 7. The stationary part includes a rearwardly facing stop shoulder 16 positioned to be in the path of the stop cam 15 when the coupling member 6 is in its coupling position as seen in FIGS. 4, 5, 10 and 11.

The cooperation is such that the coupling member 6 is rotated about the pivot pin 7 upon a forward displacement of the coupling member 6. The latch 17 is able to fittingly engage into the locking recess 18 of latch plate 19. The latch 17 and the locking recess 18 are slightly curved such that the latch 17 can enter and leave the locking recess 18 while rotating about the vertical pivot pin 7. The latch 17 is constructed to include an upper nose portion 17' and a lower nose portion 17". Part of the rear wall of the latch plate locking recess 18 is formed as a backwardly inclining guiding surface 21. The upper nose portion 17' of latch 17 has near its end on the rear side a guiding surface 20. These guiding surfaces 20 and 21 are adapted to cooperate with each other to cause the last movement of the latch into its coupling position to be achieved.

The driving part 4 and the driven part 5 are provided on their sides facing each other with cooperating stop shoulders 22 and 23, respectively. The stop shoulder 22 of the driving part 4 is facing backwardly, and the stop shoulder 23 of the driven part 5 is facing forwardly. Since both stop shoulders 22 and 23 are lying in each others paths along the stationary guide rail 2, they will come into engagement with one another upon a rearward displacement of the driving part 4, whereupon the driven part 5 will be carried along by the driving part 4.

Figure 4:
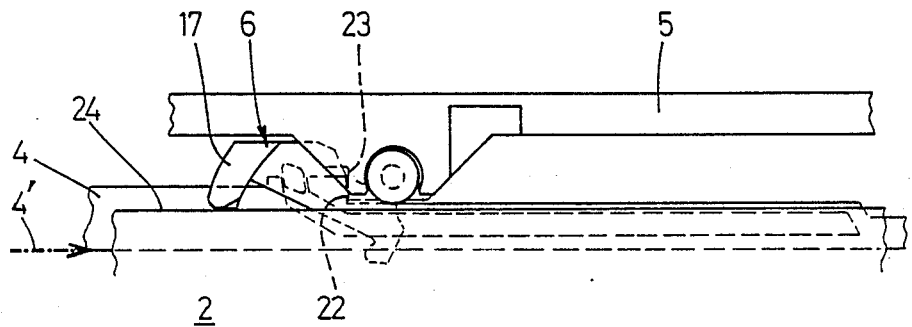
FIGS. 4–11 are plan views corresponding to FIG. 2 wherein, however, the parts are illustrated in their assembled condition, and the coupling apparatus is shown in different positions.

The stationary guide rail 2 further has a longitudinal edge 24 lying at the height of the latch 17 of the coupling member 6 and facing the coupling member 6, the longitudinal edge 24 being shown in FIGS. 2 and 4, but being omitted in the remaining figures for the sake of clarity.

OPERATION

Referring now to FIGS. 4–11, FIG. 4 shows the coupling apparatus as it is positioned when the roof panel 1 is below the fixed roof and ready to be moved in a rearward direction. The driving of the roof panel to the rear and below the fixed roof by the pulling and pushing means 4' takes place through pull-push means 4' pushing the driving part 4, and the driving part 4 driving the driven part or control part 5 to the rear. The drive force between the driving part 4 and the driven part 5 is transmitted by both stop shoulders 22 and 23 thereof.

The locking nose or latch 17 of the coupling member 6 is laterally confined with play between a longitudinal edge of the driven part 5 and the longitudinal edge 24 of the stationary guide rail 2. Consequently, the coupling member 6 is positively prevented from being displaced out of the coupling position shown in FIGS. 4 and 5 by any cause.

Figure 5:
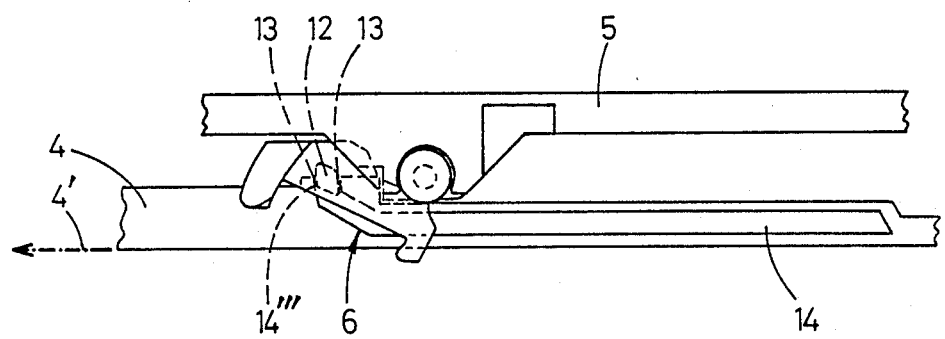

In FIG. 5 the direction of movement of the driving part 4 is shown to be reversed so that the roof panel 1 can be moved in the direction toward the closed position. In the position shown, the guide cam 12 of the coupling member 6 is still in the front slot portion 14''' which extends substantially transverse to the direction of movement of the driving part 4, so that the guide cam 12 is held in this position in a stable manner. The driving part 4 and the driven part 5 are coupled to each other by the coupling member 6 through the engagement of the guide cam 12 in the front slot portion 14''' of the guide slot 14 of the driving part 4 and the pivot connection 7, 8 between the coupling member 6 and the driven part 5. With the parts in this position, it is an advantage that a line drawn between the axis of pivot pin 7 and the point of contact of guide cam 12 of the coupling member 6 with the wall of the front slot portion 14''' of guide slot 14 will be parallel to the direction of movement of the driving part 4. As a result, no torque or substantially no torque is exerted on the coupling member 6 or the driving part 4 and the driven part 5. As a consequence thereof, the driving part 4 is experiencing no additional resistance when it is moved.

Figure 6:
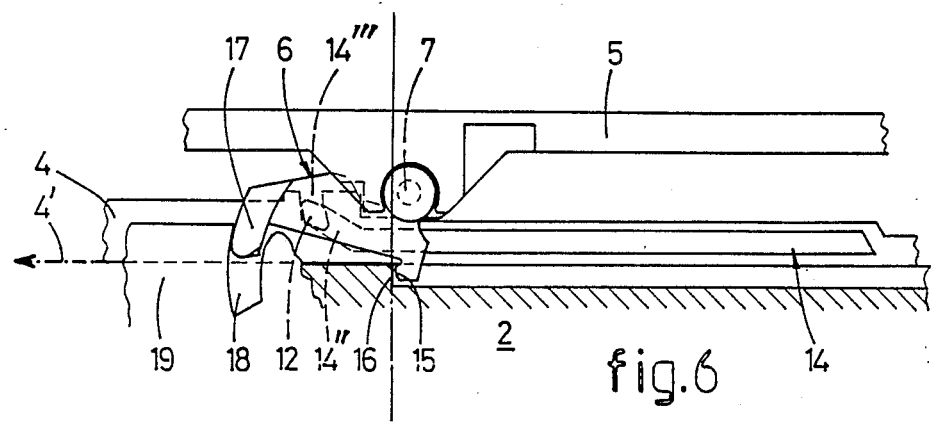

FIG. 6 shows the position of the coupling apparatus, wherein the stop cam 15 of the coupling member 6 has come into engagement with the stop shoulder 16 of the stationary guide rail 2. As a result a torque about the pivot pin 7 is exerted on the coupling member 6 and will cause the coupling member 6 to pivot about this pivot pin 7. Consequently, the locking nose or latch 17 enters the locking recess 18, while the guide cam 12 moves from the front slot portion 14''' of the guide slot 14 extending substantially transverse to the direction of movement of the driving part into the intermediate slot portion 14'' inclining to said direction of movement. Because the latch 17 has entered into the locking recess 18 it is only possible for the driven part 5 to move very slightly in dependence of the engagement of the latch 17 in the locking recess 18.

Figure 7:
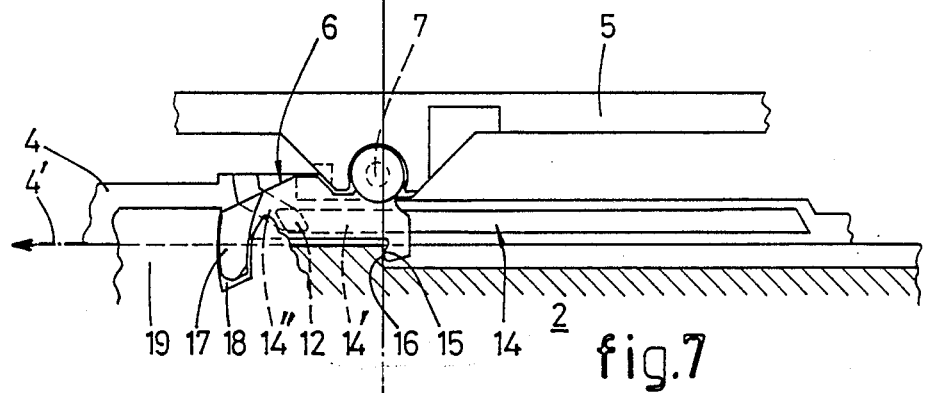

In FIG. 7, the coupling member 6 has pivoted about the pivot pin 7 to such an extent that the extreme position thereof is reached and the latch 17 has maximally moved into the locking recess 18. The pivoting movement of the coupling member 6 between the positions of FIGS. 6 and 7 is determined by the relative movement between the inclined slot portion 14'' of the guide slot 14 in the driving part 4 and the guide cam 12 of the coupling member 6. In FIG. 7, the guide cam 12 is at the transition between the inclined intermediate slot portion 14'' and the longitudinally extending rear slot portion 14'.

Figure 8:
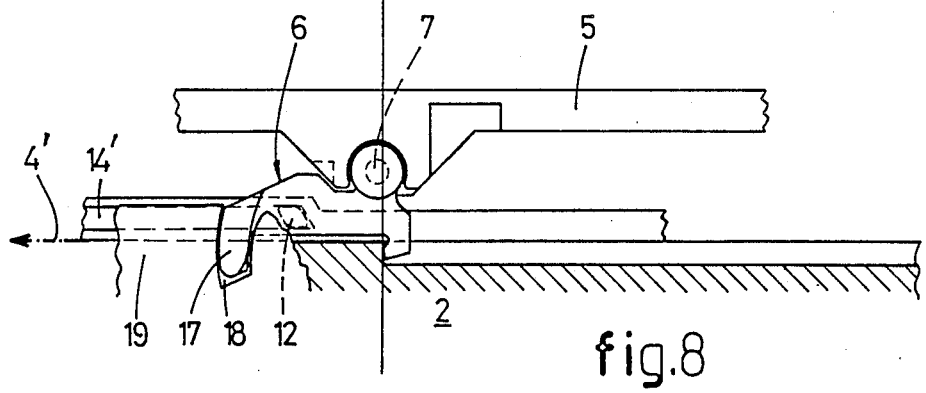

FIG. 8 illustrates the position of the coupling apparatus wherein the driving part 4 has reached its front position to bring the roof panel to its extreme venting position. Between the positions of FIGS. 7 and 8 the driven part 5 is fully locked with respect to the stationary guide rail 2 by the coupling member 6. This permits relative displacement between the driving part 4 and the driven part 5. The coupling member 6 is retained in its locking position by the engagement of the guide cam 12 in the rear slot portion 14' of the guide slot 14 in the driving part 4 as part 4 moves forwardly with respect to part 5 and the stationary part, whereby the coupling member 6 is prevented from pivoting about the pivot pin 7.

Figure 9:
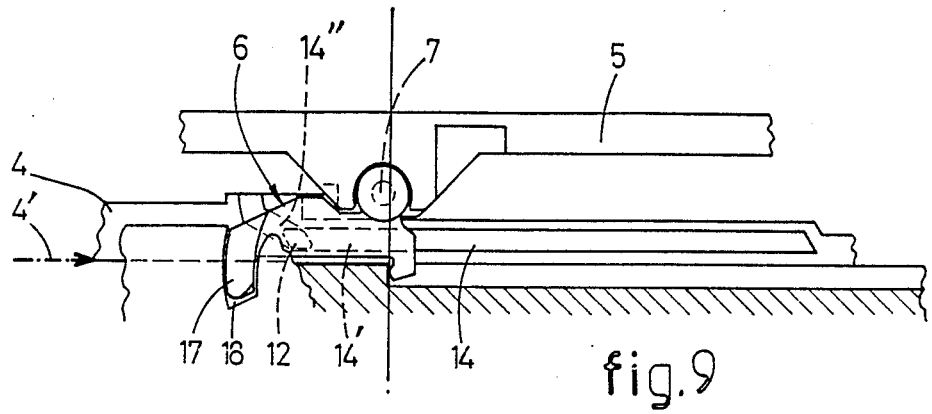

In FIG. 9, the driving part 4 has been moved back again to such an extent that the position of FIG. 7 is reached.

Figure 10:
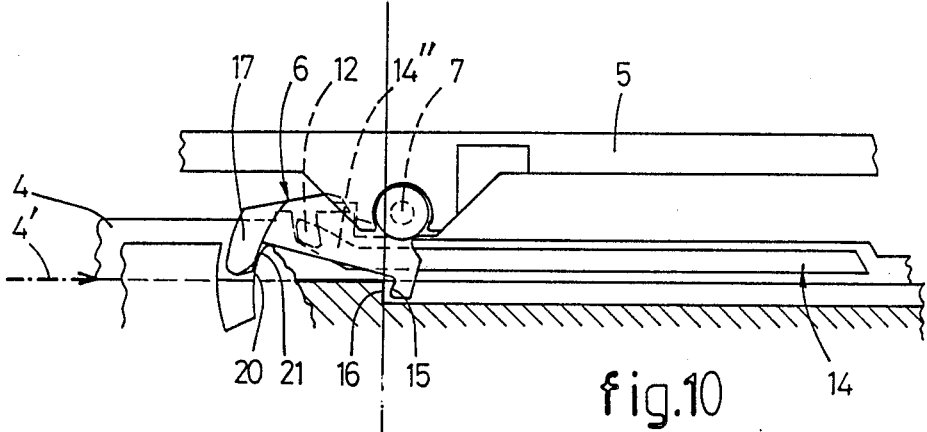

FIG. 10 shows the position of the coupling apparatus wherein the driving part 4 is slid further backwardly such that the guide cam 12 of the coupling member 6 has passed through the inclined intermediate slot portion 14'' and has reached the front slot portion 14'''. As a result of the slight play of the latch 17 in the locking recess 18 in the position of FIG. 10, the coupling member 6 is slid rearwardly by the driven part 5, which is driven by the driving part 4 as a consequence of the engagement of the stop shoulders 22 and 23, such that the stop cam 15 has come out of engagement with the stop shoulder 16. A further pivoting movement of the coupling member 6 by means of the engagement of the guide cam 12 thereof in the guide slot 14 of the driving part 4 is not possible, since the front slot portion 14''' extends substantially transverse to the direction of movement of the driving part, so that through this engagement almost no lateral force can be transmitted to the guide cam 12. In order to bring the latch 17 out of engagement with the locking recess 18, guiding surfaces 20 and 21 on the latch 17 and the locking recess 18, respectively, will effectuate by their mutual engagement that the latch 17 is displaced laterally upon a rearward displacement of the driving part 4 and consequently coupling member 6, so that the coupling member 6 is pivoted about the pivot pin 7 until the latch 17 is urged completely out of the locking recess 18.

Figure 11:
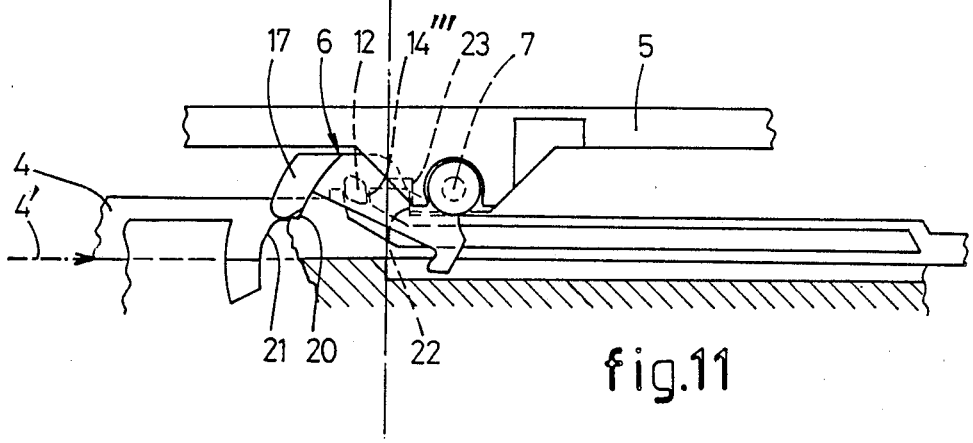

In FIG. 11, the coupling apparatus has reached again the initial position according to FIG. 4.

According to the invention there is provided a coupling apparatus in the drive mechanism for a movable panel of an open roof construction for a vehicle, which comprises a fully forcibly and positively guided and positively retained coupling member which, in the coupled position, exerts no force onto the drive mechanism which could cause additional friction.

Although the present invention has been described with reference to preferred embodiments, workers skilled in the art will recognize that changes may be made in form and detail without departing from the spirit and scope of the invention.

I claim:

1. Coupling apparatus for use in a drive mechanism for a roof panel movable with respect to a fixed roof having an opening therein between forward closed, rearward open and vent positions, wherein a driving part and a driven part are slidably mounted to a stationary part which is fixedly mounted to the roof in adjacent relation to the roof opening, wherein pull-push means is operably attached to the driving part, wherein the roof panel is adapted to be attached to the driving part and the driven part, and wherein means is provided to alternately couple and uncouple the driven part with respect to the driving part and to alternately lock and unlock the driven part with respect to the stationary part; the improvement wherein:
  (a) the stationary part includes a pair of relatively straight guide rails fixedly mounted to the roof adjacent opposite sides of the roof opening and extending in direction from front to rear of the roof;
  (b) the coupling means includes a coupling member which is pivotally connected to the driven part with a substantially vertical pivot pin;
  (c) the stationary part also includes as said coupling means a latch plate provided with a locking recess;
  (d) the coupling member is pivotable about the pivot pin between a coupling position in which it couples the driven part to the driving part while allowing the driving part and the driven part to move with respect to the guide rails, and a locking position in which it locks the driven part with respect to the locking recess while allowing the driving part to move with respect to the driven part and the guide rails;
  (e) the coupling member is provided with a stop cam and the stationary part is provided with a cooperating stop shoulder in alignment with the coupling member stop cam in position so that forward movement of the coupling member with respect to the stationary part will bring the cam and the stop shoulder into contact with each other to cause the coupling member to pivot about the pivot pin so that the coupling member will move into engagement with the locking recess of the latch plate;
  (f) the coupling member is provided with a latch guide element, and the stationary part is provided with a cooperating latch plate guide element situated to bring the coupling member into engagement with the locking recess of the latch plate when the coupling member moves forwardly with respect to the stationary part, and to bring the coupling member out of engagement with the locking recess when the coupling member is moved in a direction rearwardly of the stationary part; and
  (g) the coupling member has cam guide surface and the driving part has cooperating cam guide elements to move the coupling member between coupling position and locking position.

2. The apparatus of claim 1 wherein:
  (h) the coupling member stop cam is spaced radially from the vertical axis of the pivot pin, and the stationary part stop shoulder faces backwardly and lies in the path of the coupling member stop cam when the coupling member is in the coupling position.

3. The apparatus of claim 1 wherein:
  (h) the coupling member is provided with a latch which includes its latch guide element and which is able to engage into the latch plate locking recess of the stationary part.

4. The apparatus of claim 3 wherein:
  (i) the stationary part latch plate guide element forms part of the rear wall of the latch plate locking recess, is inclined backwardly and is adapted to cooperate with the latch guide element of the coupling member latch to guide the latch fully into the latch plate recess and to start latch movement out of said recess.

5. The apparatus of claim 1 wherein:
  (h) with the coupling member in its coupling position, a point of contact between at least one of the coupling cam guide surfaces and the driving part cam guide elements lies on a straight line which is substantially parallel to the direction of movement of the driven and driving parts along the guide rails and passes through the pivot axis of the vertical pivot pin.

6. The apparatus of claim 3 wherein:
  (i) with the coupling member in its coupling position, the coupling member and its latch are laterally retained with plan between a longitudinally extending edge of the driven part and a longitudinally extending edge of the stationary part.

7. Coupling apparatus for use in a drive mechanism for a roof panel movable with respect to a fixed roof having an opening therein between forward closed, rearward open and vent positions, wherein a driving part and a driven part are slidably mounted to a stationary part which is fixedly mounted to the roof in adjacent relation to the roof opening, wherein pull-push means is operably attached to the driving part, wherein the roof panel is adapted to be attached to the driving part and the driven part, and wherein means is provided to alternately couple and uncouple the driven part with respect to the driving part and to alternately lock and unlock the driven part with respect to the stationary part; the improvement wherein:
  (a) the stationary part includes a pair of relatively straight guide rails fixedly mounted to the roof adjacent opposite sides of the roof opening and extending in direction from front to rear of the roof;

(b) the coupling means includes a coupling member connected to the driven part;

(c) the stationary part also includes as said coupling means a latch plate provided with a locking recess;

(d) the coupling member is movable between a coupling position in which it couples the driven part to the driving part while allowing the driving part and the driven part to move with respect to the guide rails, and a locking position in which it locks the driven part with respect to the locking recess while allowing the driving part to move with respect to the guide rails;

(e) the coupling member is provided with a stop cam and the stationary part is provided with a cooperating stop shoulder in alignment with the coupling member stop cam in position so that forward movement of the coupling member with respect to the stationary part will bring the stop cam and stop shoulder into contact with each other to cause the coupling member to move into engagement with the locking recess; and (f) the coupling member has cam guide surfaces and the driving part has cooperating cam guide elements to move the coupling member between coupling position and locking position.

8. The apparatus of claim 7 wherein:

(g) the coupling member is provided with a latch guide element, and the stationary part is provided with a cooperating latch plate guide element situated to bring the coupling member into engagement with the locking recess of the latch plate when the coupling member moves forwardly with respect to the stationary part, and to bring the coupling member out of engagement with the stationary part when the coupling member is moved in direction rearwardly of the stationary part;

(h) the coupling member stop cam in cooperation with the stationary part stop shoulder and the coupling member latch guide element in cooperation with the stationary part latch plate guide element controls the initial and final movements of the coupling member from its coupling position to its locking position; and (i) the coupling member latch guide element in cooperation with the stationary part latch plate guide element controls the initial movement of the coupling member from its locking position toward its coupling position.

9. The apparatus of claim 8 wherein:

(j) the driving part cam guide elements include the side walls of a guide slot provided in the driving part; and (k) the coupling member cam guide surfaces are embodied in a guide cam extending integrally from the coupling member and situated within the guide slot in operational contact with the guide slot side walls.

10. The apparatus of claim 9 wherein:

(1) the driving part guide slot is continuous and includes a rear slot portion having side walls which are parallel to the direction of movement of the driving part with respect to the guide rails, a front slot portion having side walls extending substantially transversely to said direction of movement, and an inclined intermediate slot portion whose side walls provide a guiding passage for the coupling member guide cam between the side walls of the rear slot portion and the side walls of the front slot portion of the driving part guide slot.

11. The apparatus of claim 7 wherein:

(g) the driving part is provided with a backwardly facing stop shoulder and the driven part is provided with a forwardly facing stop shoulder lying in the path of the driving part stop shoulder, said stop shoulders coming into operational contact with each other at the point the coupling member is to begin its move from its locking position toward is coupling position.

* * * * *

UNITED STATES PATENT AND TRADEMARK OFFICE
CERTIFICATE OF CORRECTION

PATENT NO. : 4,974,902

DATED : December 4, 1990

INVENTOR(S) : Johannes N. Huyer

It is certified that error appears in the above-identified patent and that said Letters Patent is hereby corrected as shown below:

ON TITLE PAGE: Item 19 and

In [75] Inventor:, delete "Huiyer", insert --Huyer--.

Col. 8, line 13, delete "surface", insert --surfaces--.

Col. 8, line 49, delete "plan", insert --play--.

Col. 10, line 39, delete "is", insert --its--.

Signed and Sealed this

Twenty-third Day of June, 1992

Attest:

DOUGLAS B. COMER

*Attesting Officer*   Acting Commissioner of Patents and Trademarks